US012598157B2

(12) United States Patent
Hilgenkamp et al.

(10) Patent No.: US 12,598,157 B2
(45) Date of Patent: Apr. 7, 2026

(54) APPARATUS HAVING A NETWORK COMPONENT, CONNECTED BETWEEN AT LEAST TWO NETWORKS, WITH RECORDING FUNCTIONALITY FOR RECORDING COMMUNICATION RELATIONSHIPS PRESENT DURING THE PASSAGE OF DATA TRAFFIC, AND METHOD FOR OPERATING A NETWORK COMPONENT

(71) Applicant: Phoenix Contact GmbH & Co. KG, Blomberg (DE)

(72) Inventors: Ingo Hilgenkamp, Rietberg (DE); Andreas Fuss, Berlin (DE); Gerrit Boysen, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 253 days.

(21) Appl. No.: 17/909,069

(22) PCT Filed: Mar. 3, 2021

(86) PCT No.: PCT/EP2021/055296
§ 371 (c)(1),
(2) Date: Sep. 2, 2022

(87) PCT Pub. No.: WO2021/175906
PCT Pub. Date: Sep. 10, 2021

(65) Prior Publication Data
US 2023/0042469 A1 Feb. 9, 2023

(30) Foreign Application Priority Data
Mar. 6, 2020 (BE) .................................. 2020/5153

(51) Int. Cl.
*H04L 9/40* (2022.01)

(52) U.S. Cl.
CPC ...... *H04L 63/0236* (2013.01); *H04L 63/0263* (2013.01)

(58) Field of Classification Search
CPC ........................ H04L 63/0236; H04L 63/0263
(Continued)

(56) References Cited

U.S. PATENT DOCUMENTS

2014/0368601 A1* 12/2014 deCharms .............. H04N 7/148
348/14.02
2015/0081818 A1* 3/2015 Ye ......................... H04L 65/403
709/206
(Continued)

FOREIGN PATENT DOCUMENTS

DE 102010045256 A1 5/2011
EP 2296340 A2 * 3/2011 ......... H04L 63/0263

OTHER PUBLICATIONS

English machine-translation of Reister provided by WIPO at https://patentscope.wipo.int/search/en/detail.jsf?docPN=EP2296340, pp. 1-6 (Year: 2011).*
(Continued)

*Primary Examiner* — David P Zarka
(74) *Attorney, Agent, or Firm* — Kaplan Breyer Schwarz, LLP

(57) ABSTRACT

An apparatus includes a network component that is connected between at least two communication, installation and/or computer networks and is suitable and designed for allowing the passage of data traffic between the networks on the basis of adaptable and appropriately activated data traffic rules or for blocking the passage of data traffic through the network component. The network component has a communication relationship recording functionality for recording the communication relationships present during the passage of the data traffic. The recording functionality can be temporarily activated and/or deactivated for recording com- (Continued)

munication relationships, and the processing of the recorded communication relationships for the purpose of adapting and subsequently activating the data traffic rules is enabled only when the communication relationship recording functionality is deactivated. Also, a method for operating such a network component.

6 Claims, 5 Drawing Sheets

(58) Field of Classification Search
USPC ........................................................ 726/11
See application file for complete search history.

(56) References Cited

U.S. PATENT DOCUMENTS

| | | | |
|---|---|---|---|
| 2015/0372980 A1 | 12/2015 | Eyada | |
| 2015/0381475 A1* | 12/2015 | Yamamoto | H04W 24/08 |
| | | | 370/216 |
| 2017/0201423 A1* | 7/2017 | Crowe | H04L 41/0823 |
| 2018/0069899 A1 | 3/2018 | Lang et al. | |
| 2018/0288181 A1* | 10/2018 | Braud | H04L 69/03 |
| 2018/0359639 A1* | 12/2018 | Trama | H04W 48/04 |
| 2020/0322669 A1* | 10/2020 | Dunning | H04N 21/4147 |
| 2020/0349947 A1* | 11/2020 | Kim | G06F 3/167 |
| 2020/0351309 A1* | 11/2020 | Warburton | H04L 63/205 |
| 2021/0328993 A1* | 10/2021 | Komu | H04L 63/0263 |
| 2023/0139089 A1* | 5/2023 | Park | H04L 63/0236 |
| | | | 726/1 |
| 2024/0187379 A1* | 6/2024 | Cai | H04L 41/145 |

OTHER PUBLICATIONS

Authorized Officer: Agnes Wittmann-Regis, English Translation of the International Report on Patentability, Sep. 6, 2022, 8 pp.
Authorized Officer: Koch, Gyorgy, International Search Report issued in PCT application No. PCT/EP2021/055296, Apr. 1, 2021, 2 pp.
Office Action issued in German patent application No. 102020106071. 8, Oct. 5, 2020, 15 pp. w/ translation.
Search Report issued in Belgian patent application No. BE2020/ 5153, Nov. 16, 2020, 9 pp.

* cited by examiner

APPARATUS HAVING A NETWORK COMPONENT, CONNECTED BETWEEN AT LEAST TWO NETWORKS, WITH RECORDING FUNCTIONALITY FOR RECORDING COMMUNICATION RELATIONSHIPS PRESENT DURING THE PASSAGE OF DATA TRAFFIC, AND METHOD FOR OPERATING A NETWORK COMPONENT

FIELD

The invention relates to an apparatus having a network component, connected between at least two networks, with recording functionality for recording communication relationships present during the passage of data traffic, and to a method for operating a network component.

BACKGROUND

In order to allow communication and/or the exchange of data across the boundaries of a network and/or, for example, to connect a network to the Internet or to another network, it is known that network components are often used at the outer boundaries of a network or between at least two communication, system and/or computer networks, which network components allow interconnection of a plurality of networks, even using different protocols or media. In the context of the invention, the term network thus in principle also relates to sub-areas of such a network, right down to individual network cells, at the outer boundaries of which a network component of this kind is then used in each case. In this case, the incoming and/or outgoing network traffic is frequently also monitored, and it is decided, on the basis of a series of defined security rules, whether certain data traffic will be permitted or blocked. In practice, such network components for monitoring the incoming and/or outgoing network traffic conventionally have the functionality of what is known as a firewall.

In particular from the field of the IT security environment and the OT environment, i.e. the field of operational technology, various designs are known for industrial firewalls as well.

However, the correct configuration of a firewall often poses significant challenges for employees from the OT environment, in particular if they lack sound IT know-how. DE 10-2010 045 256 A1 describes in this respect for example a method for operating a firewall device in automation networks in order to simplify the configuration of an industrial firewall. In detail, this describes a method for operating a firewall device in automation networks, wherein the firewall device is arranged between at least two networks comprising one or more infrastructure devices, and is suitable and designed for allowing data traffic to pass between networks or for blocking the transmission between the networks, depending on rules, and during a learning phase capturing data from the data traffic and deducing rules, without physically engaging in the data traffic. In this case, the capture, keeping (storage) and pre-optimization of the data is carried out in a process embedded in the firewall device, wherein the firewall device initially derives and optimizes suitable firewall rules by listening to and analyzing the network traffic, and only then gives the user the possibility of processing, discarding or accepting the proposed rules.

On the one hand, in the process described in DE 10 2010 045 256 A1, it is consequently advantageous that no open connection to the management or to an external application is necessary during the data acquisition, since the data acquisition does not sit directly on the interfaces of the individual infrastructure devices, but rather latches into the internal firewall. The security function of the firewall device thus remains maintained during the learning; at least one default packet filtering can remain active. On the other hand, a complex learning algorithm is required, since each communication relationship first results in a temporary firewall rule, and a set of rules, subsequently created, must be reduced again via an optimization of the rules.

SUMMARY

The object of the invention is to provide a considerably simpler possibility by means of which the rules of a network component in relation to data traffic to be passed through and/or blocked can be adapted to current or changing circumstances, in particular changing communication relationships, and the data acquisition necessary for this purpose for rule adjustment can be operated in the simplest manner, in particular even employees without IT knowledge and in particular without special access rights.

The solution according to the invention is provided by an apparatus or a method having the respective features according to the appended independent claims. Preferred developments are the subject-matter of the respective dependent claims.

Accordingly, an apparatus is proposed which comprises a network component which is connected between at least two communication, system and/or computer networks and is suitable and designed for allowing data traffic to pass between the networks or for blocking a passage of data traffic through the network components, depending on adaptable and correspondingly activated data traffic rules. In this case, the network component has a recording functionality for recording the communication relationships that are present during passage of the data traffic, wherein an activation/deactivation device interacting with the recording functionality is further included, for temporary activation and/or deactivation of the recording functionality, and the network component is configured to release the recorded communication relationships for adapting and subsequently activating the data traffic rules only when the recording functionality is deactivated.

A significant advantage in this case is consequently that the network component, which can be used according to the above definition, in particular also between sub-areas of a network and/or individual network cells, only has recording functionality for recording the communication relationships present during the passage of the data traffic, which can be temporarily activated and/or deactivated by means of an activation/deactivation device. Since an adaptation and subsequent activation of the data traffic rules, based on the recorded communication relationships, can take place only when the recording functionality is deactivated, and consequently no learning phase is included, during which learning phase rules are also already being derived, no complex learning algorithm is required. It is rather the case that, on the one hand, the activation/deactivation device can be constructed extremely easily, and activation or deactivation can take place as required and in a very individual manner, without IT knowledge having to be necessary for this purpose. On the other hand, the adaptation, which is separate therefrom and is to be performed separately, and subsequent activation of the data traffic, can then take place on the basis of the recorded communication relationships, after their approval, in the same way in a very individual and flexible manner, in particular also location-independently, i.e. for example even remotely. Since, together with the recording, there is consequently also no intervention in the data traffic rules which could have impacts on security, the activation of such a recording can take place in particular also without special access rights.

In the case of the apparatus according to the invention, but also the method, accordingly characterized by similar advantages, for operating a network component which is connected between at least two communication, system and/or computer networks, and is suitable and designed for allowing data traffic to pass between the networks or for blocking a passage of data traffic through the network component, depending on adaptable and correspondingly activated data traffic rules, in which the network component has a communication relationship recording functionality for recording the communication relationships present during passage of the data traffic, wherein the recording functionality for recording communication relationships can be temporarily activated and/or deactivated, and only when the communication relationship recording functionality is deactivated will the processing of the recorded communication relationships for the adaptation and subsequent activation of the data traffic rules be enabled, recordings are consequently expediently provided, by means of which the communication relationship recording functionality can be activated and/or deactivated by means of a START/STOP button, in particular in a web-based management of the network component, by connecting a signal onto a predetermined digital signal terminal of the network component, and/or by means of an external, in particular central, management tool.

In particular, in order to keep the complexity as regards data recording as low as possible, it is also expediently provided that, when the communication relationship recording functionality is activated, already recorded communication relationships are not to be recorded again in the event of repeated occurrence.

In a particularly preferred embodiment, it is further provided that, in the apparatus according to the invention or the network component according to the invention, the activation of the recording functionality can activate a timer function, in particular in order to couple the recording to a prespecifiable time window. It can also expediently be provided that such an activated timer function can also be used for selectively deactivating the recording functionality, in particular in order to thereby deactivate an activated recording functionality again if necessary. In a particularly preferred, supplementary or alternative embodiment, it is further provided that the state of an activated recording functionality is displayed by means of a visual and/or acoustic display, and/or the access to the currently activated data traffic rules can be temporarily enabled and/or blocked.

BRIEF DESCRIPTION OF THE DRAWINGS

Further advantages and features of the invention are apparent from the following description of some preferred exemplary embodiments with reference to the accompanying drawings, in which.

DETAILED DESCRIPTION

Figure 1:
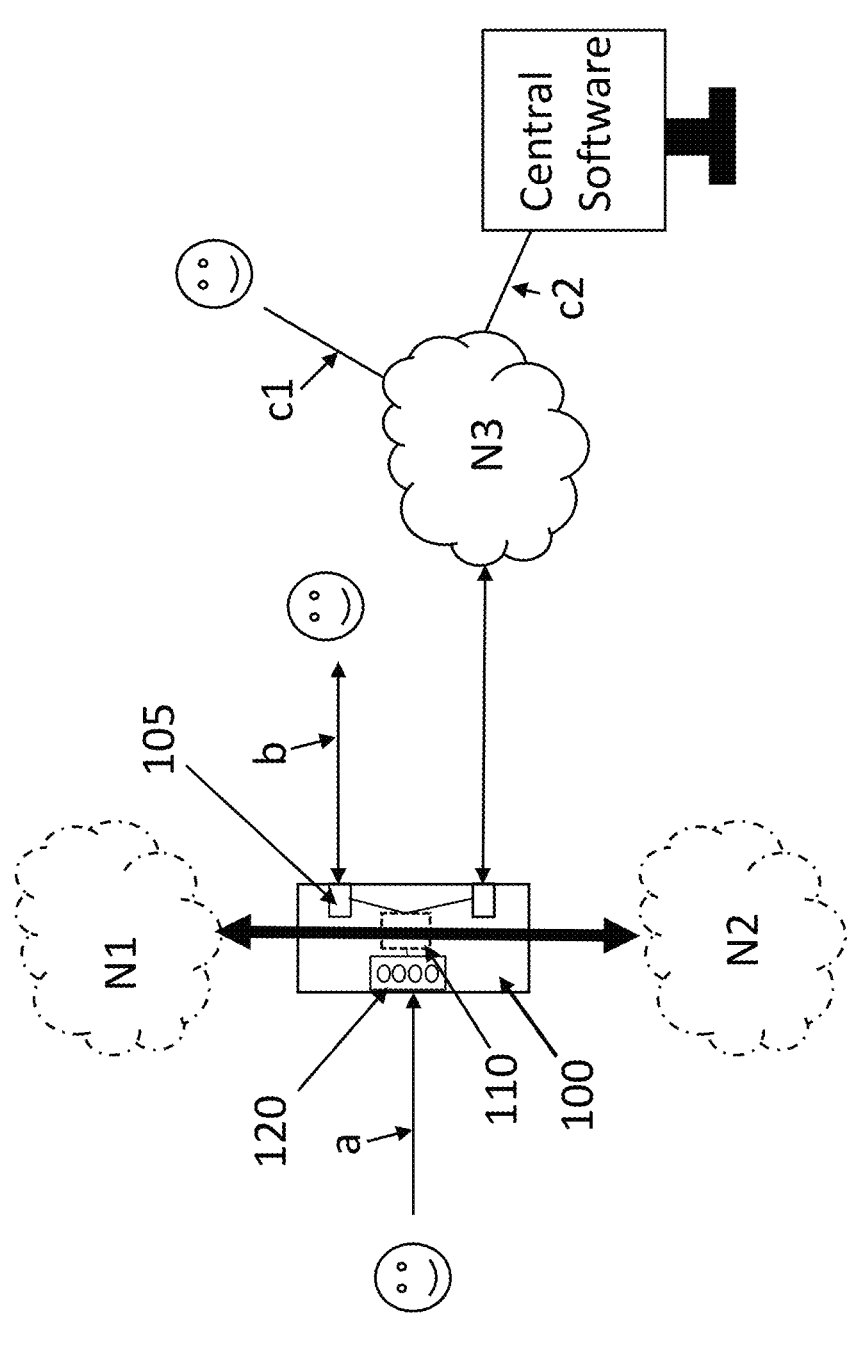
FIG. 1 is a highly schematic view of a network component according to the invention with various exemplary embodiments for activating the communication relationship recording functionality.

FIG. 1 is a highly schematic view of a network component 100 according to the invention with various exemplary embodiments for activating the communication relationship recording functionality, wherein the activation/deactivation device can in each case be designed in hardware and in software, as described in more detail below.

Even though a further device containing the network components is not shown for reasons of clarity, it is outlined in FIG. 1 that the network component 100 is connected between two networks N1 and N2. The double-headed arrow arranged between the networks N1 and N2 and passing through the network component 100 indicates that this is suitable and designed for allowing data traffic to pass between the networks N1 and N2 or even for blocking a passage of data traffic through the network component, depending on data traffic rules. The network component 100 is consequently expediently configured in a practical embodiment with a router and/or firewall function, or is designed overall as a router and/or firewall device, wherein the data traffic rules stored in the network component 100 can be adapted and activated accordingly. In other words, the network component 100 is further configured such that the data traffic rules are also deactivated or not activated. Expediently, the network component 100 is configured in this case such that no data traffic between networks is blocked.

The networks N1 and N2 shown in dashed lines in FIG. 1 each form a communication, system and/or computer network, wherein such a network can in particular also be formed in each case by a sub-region of a larger network, up to individual network cells, at the outer boundaries of which such a network component is then used. For example, the network component 100 separates a particular network cell N1 from another network region N2, wherein the network cell N1 can correspond, for example, to a specific production cell of a system network, at the outer boundary of which the network component 100 is inserted in order to be able to control access from outside the network cell N1, i.e., in particular coming from the network or network region N2.

Figure 2:
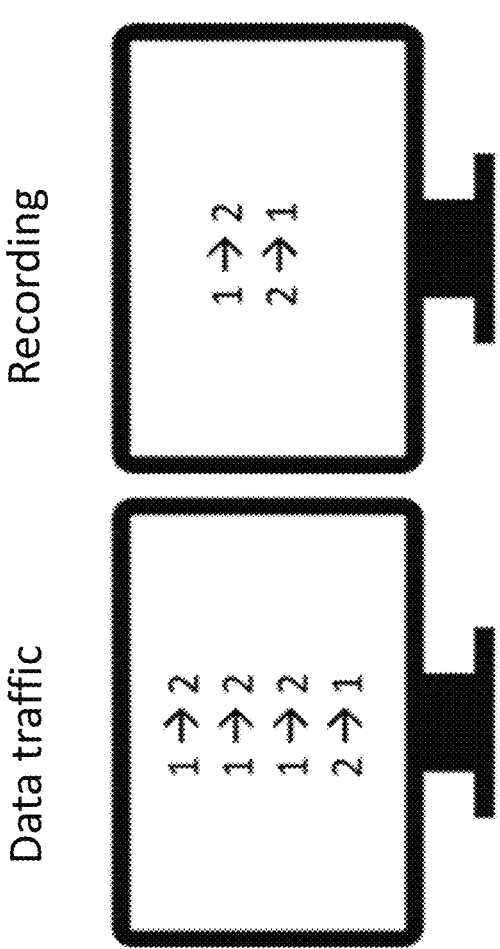
FIG. 2 shows, in a highly schematic manner, the recording of the communication relationships present during passage of the data traffic.

In the case of the network component 100, a component 110 is also shown in dashed lines, in particular a component 110 integrated into the network component 100, which provides a recording functionality for recording the communication relationships present during passage of the data traffic. The recording functionality of component 110 can be activated and also deactivated. In particular, it can be provided that recording functionality is deactivated in a basic state of component 110 and can be activated temporarily. Here it can also be provided, according to one embodiment, that, after activation of the recording functionality, this must be deactivated again. Alternatively or additionally, however, it can also preferably be provided that the recording functionality is coupled with a timer function. It is provided that the network component 100 is designed to enable the recorded communication relationships to adapt and subsequently activate the data traffic rules only when the recording functionality is deactivated. As regards the recording of the communication relationships, the recording functionality is thus expediently designed such that recording of the communication relationships present during passage of the data traffic does not comprise recording double entries, as shown in a highly schematic manner in FIG. 2. In other words, it is expediently provided that, when the communication relationship recording functionality is activated, already recorded communication relationships are not recorded once again in the event of repeated occurrence.

Furthermore, since the recorded communication relationships are only released when the recording functionality is deactivated, such an automatic algorithm, which combines and optimizes the communication rules, is not used either in the network component according to the invention or during operation thereof. In contrast, according to the subject-matter of the invention, expediently, after recording, a rule for each recorded communication relationship will then consequently exist, i.e. in particular which infrastructure or network device 1 from the one network communicates, in which direction, with which infrastructure or network device 2 from another network. This improves inter alia the transparency, the reproducibility and the intelligibility of results and thus also ultimately the overall security.

In order to temporarily activate and/or deactivate the recording functionality, the apparatus according to the invention therefore comprises an activation/deactivation device which interacts with the recording functionality and which can in principle be designed differently.

In an expedient embodiment, it is provided here that a START/STOP button 105 for example, in particular in a web-based management of the network component 100, is included for the activation/deactivation device, via the actuation of which button the recording functionality can be activated and/or deactivated, as indicated in FIG. 1 by the arrow marked b. If such a button is arranged in a web-based management of the network component 100, it will also be possible, for example, to communicate directly with the network component 100 via a web browser, also via a further network, for example the network marked N3 in FIG. 1, in order to activate and/or deactivate the recording functionality, as indicated in FIG. 1 by the arrow marked c1.

In a further supplementary or alternative embodiment, it is further provided that for example an external, in particular central, management tool is included for the activation/deactivation device, such as the management tool designated "central software" in FIG. 1, via which, indicated by the arrow marked c2 in FIG. 1, communication takes place with the network component 100 in order to activate and/or deactivate the recording functionality.

In a further supplementary or alternative embodiment, it is further provided that, for the activation/deactivation device, for example a predetermined digital signal input connection of the network component 100 can be used for injecting a signal to activate and/or deactivate the recording functionality, indicated In FIG. 1 by the arrow marked a.

In this case, as is frequently common, the network component 100 has for example at least one signal connection block 120, which comprises a number, in particular a plurality, of signal input terminals, and generally also a number, in particular a plurality, of output terminals. Such input and output terminals generally provide digital signal connections and are known per se to a person skilled in the art. In FIG. 5a, a network component 100 is shown schematically, by way of example, with two such signal connection blocks 120 and 120'.

By means of the signal connection block 120', and by using a switch or pushbutton 24, a predetermined connection, in particular with a digital input, for temporarily activating the recording functionality can initially be applied to a voltage potential, e.g. 24 V, necessary for this, for the temporary activation of the recording functionality. In order to deactivate the recording functionality, the connection to the necessary voltage potential can be interrupted by means of the switch or pushbutton 24. Instead of a switch or pushbutton 24, however, a control component 25 (cf. FIG. 5b) can also be used, for example, in order to inject corresponding control signals into a respective predetermined digital signal input connection of a signal connection block marked there with 120" for temporary activation and/or deactivation of the recording functionality.

As a further supplementary or alternative possibility, FIG. 5a shows another embodiment in which, for example, by establishing an electrical connection, for example by setting a wire bridge between two signal terminals of the signal connection block marked with 120, a signal for temporarily activating and/or deactivating the recording functionality can be injected into a predetermined digital signal input connection, in particular when the wire bridge is set between a 24V voltage output and this predetermined digital signal input connection, for example the digital signal input connection DI1. Depending on whether an electrical connection is established or interrupted, the recording functionality is consequently activated and deactivated, or vice versa.

As will be shown in more detail below, further functions can also be implemented by means of previously described buttons, central management tools, control components, and/or on a predetermined digital signal input connection of the network component, and correspondingly switchable signals. In particular, in addition or alternatively, a blocking device for temporarily blocking access to the data traffic rules, currently activated in each case, can hereby be established, for example also via a different predetermined digital signal input connection, for example signal input connection DI2, i.e. the access to the data traffic rules, currently activated in each case, can be temporarily enabled and/or blocked. Alternatively or additionally, the activation of a timer function can also be realized as a further function, in particular when the recording functionality is activated, e.g. via signal input connection DI3, and/or also the deactivation or changing of such an activated timer function. One or more timer function(s) as described above is or are symbolized in FIG. 5b by a timekeeper or timer 27, which is accommodated by the device according to the invention, in particular by the network component 100, and is correspondingly suitably coupled by the coupled recording functionality.

In particular when a predetermined digital signal input connection of the network component 100 is used for connecting a signal to implement one or more above-mentioned functions, this can consequently also be performed by a user who has no special access rights, such as password, user role, etc., to the network component. The allocation of rights, roles and passwords for implementing such functions can thus in principle be minimized or saved. Even without special access rights, each user, in particular employees, would be able, on site, for example to start a recording if necessary, or to stop it if necessary.

If the network component according to the invention provides a web-based management as a configuration option, corresponding buttons will be expediently integrated in the configuration interface, which buttons start or also stop, and/or activate or deactivate, the one and/or other function indicated above.

It should be mentioned that, for implementing identical functions as described above, a network protocol, for example SNMP (Simple Network Management Protocol), corresponding objects in a management information base, for example what is known as an MIB (Management Information Base) or a script, e.g. CGI (Common Gateway Interface), which defines a standard for the data exchange between a web server and third software, can also be used.

Figure 5B:
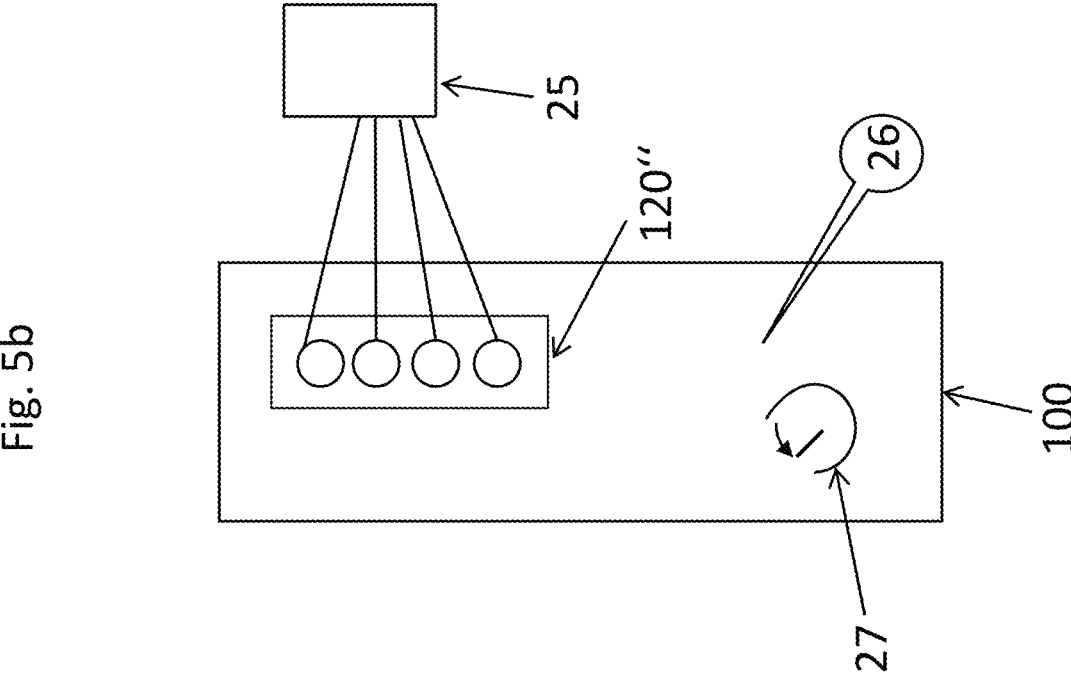
FIGS. 5a, 5b are highly schematic partial views of network components according to the invention with different embodiments of an activation/deactivation device according to the invention.
Figure 5A:
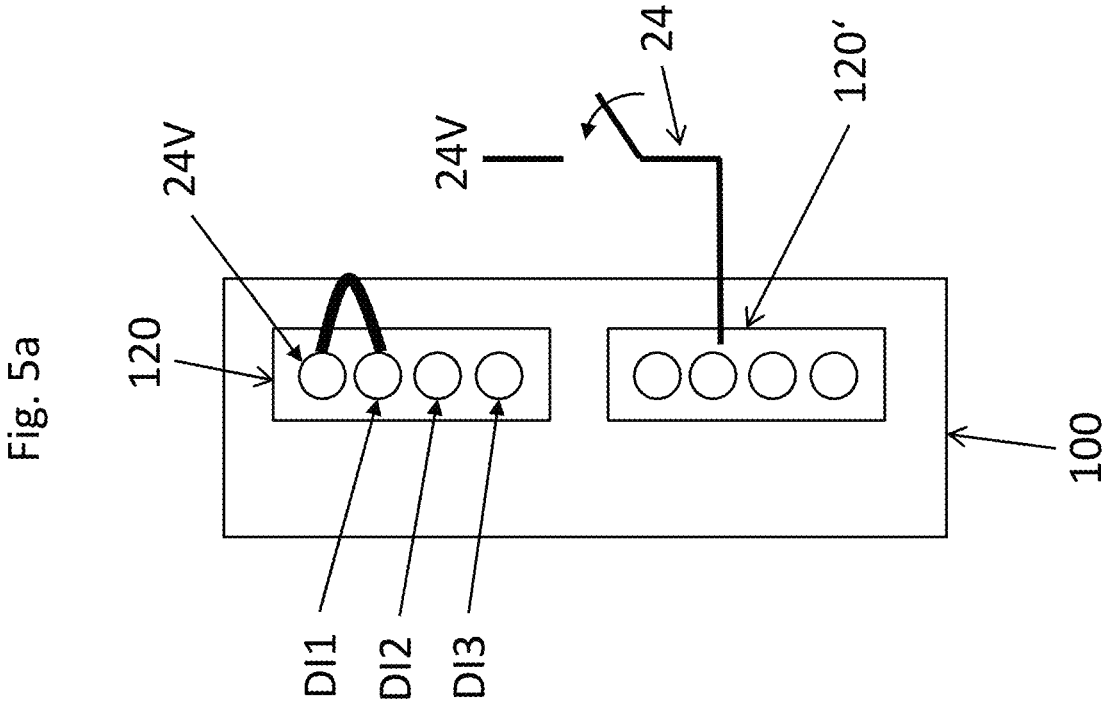

In FIG. 5b, a display 26 coupled to the recording functionality is further included in the apparatus according to the invention, in particular the network component 100, for displaying the state of an activated recording functionality. Depending on the design, such a display can visually and/or acoustically indicate whether the recording functionality is activated or not.

Figure 3:
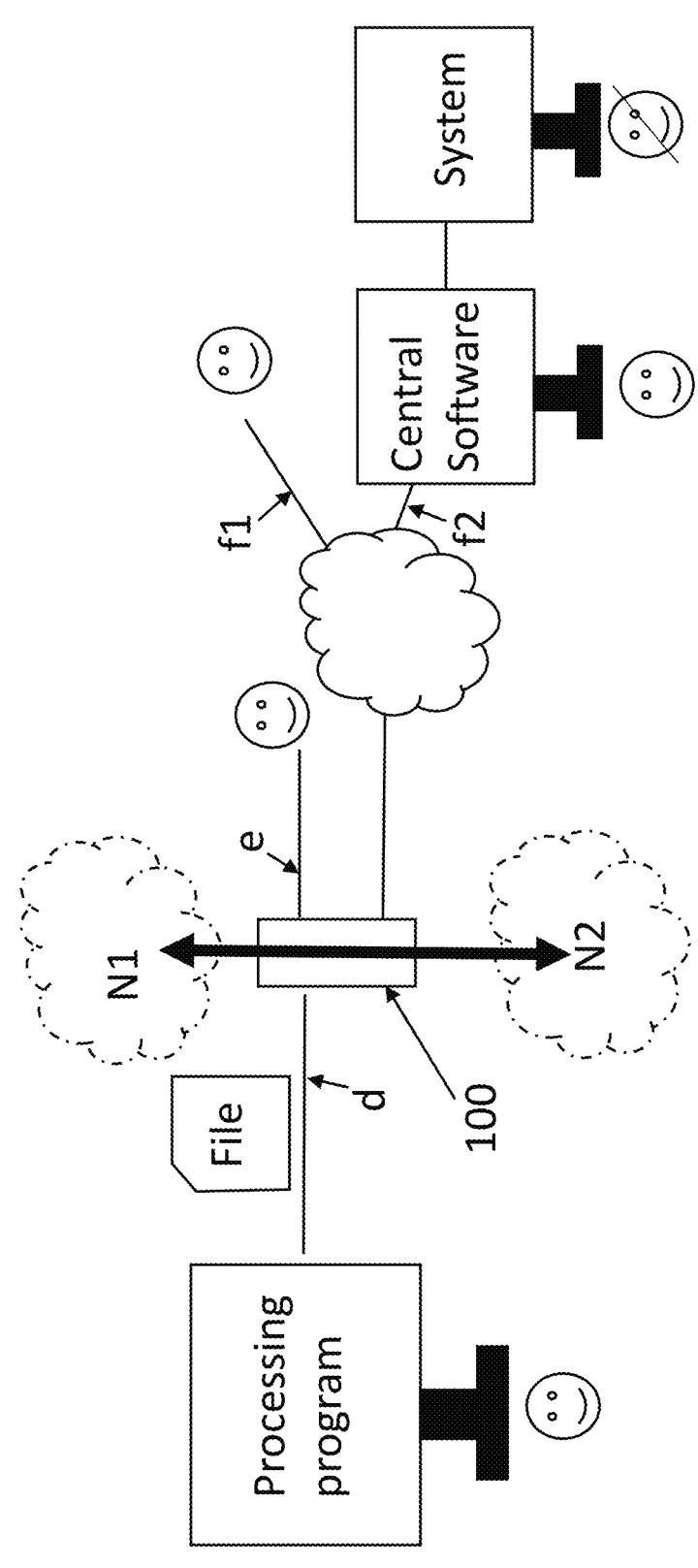
FIG. 3 is a highly schematic view of a network component according to the invention with various exemplary embodiments for adapting and subsequently activating the data traffic rules.

After conclusion of the recording of the communication relationship, i.e. when the recording functionality is then deactivated and thus in the case of released processing of the recorded communication relationships, the data set with the recorded communication relationships can expediently be checked locally or also remotely and processed as required, as can also be seen from FIG. 3, which shows a network component according to the invention in a highly schematic representation with various exemplary embodiments for adapting and subsequently activating the data traffic rules. For example, the data set can be loaded locally via a corresponding interface into a processing program of a computer and processed there. If the data set is present, for example, in the form of a list, a table processing program for processing and thus for adapting the data set and the corresponding data traffic rules can be used, for example. After processing, the processed file can then again be transferred for updating the data traffic rules stored in the network component, as indicated in FIG. 3 by the arrow marked d.

The transfer of the adapted data traffic rules and subsequent activation in order to then, depending thereon, allow the passage of data traffic between the networks or to block the passage of data traffic through the network component, can then take place in a manner specific to the application or network components, for example by means of an actuating switch configured for this purpose on the network component or also establishing an electrical connection, for example by setting a wire bridge by establishing an electrical connection between two predetermined signal terminals, as described above.

Alternatively or additionally, the adaptation and subsequent transfer of the adapted data set can also take place locally by means of a web-based management of the network component, described above, indicated in FIG. 3 by the arrow marked e.

Alternatively or additionally, the adaptation and subsequent transfer of the adapted data set can also take place by means of a remote web-based management, described above, for example also by a user via a web browser, indicated in FIG. 3 by the arrow marked f1. Alternatively or additionally, the adaptation and subsequent transfer of the adapted data set can also take place remotely by means of central software, by the user, or automatically by means of a correspondingly configured system without a user, wherein the two examples are indicated by the arrow marked f2 in FIG. 3.

In other words, the later adaptation, in particular also finalization and/or optimization, does not have to be performed on site by the device, in particular the network component, itself or on the device, in particular the network component, by a user. The verification can also be performed at a different location, at a different time, by a third party.

This also in particular offers the advantage for the case in which, for example, events have to be taken into account which did not take place within the recording period, i.e. as long as the recording functionality was activated, but which are also important in future for the availability of the one or more networks.

For example, it may be the case that during the recording phase an important but rare communication, e.g. an "emergency stop message", does not take place and is therefore not recorded. However, this message may not be blocked in the future by the network component, which is designed as described above, in particular comprising a router and/or firewall function or overall as a router and/or firewall device, and would therefore have to be added subsequently as a communication event from the past with the adapted data traffic rule.

It can also be the case, for example, that the person responsible for the OT is already aware of a foreseeable change in the future, e.g. that one or more networks, between which the network component is connected, is soon to be converted or expanded on site. These communication connections can therefore not yet be recorded, but should already be taken into account. Here too, the necessary communication relationships or corresponding data traffic rules would have to be supplemented accordingly so that there will be no problems in the future.

Figure 4:
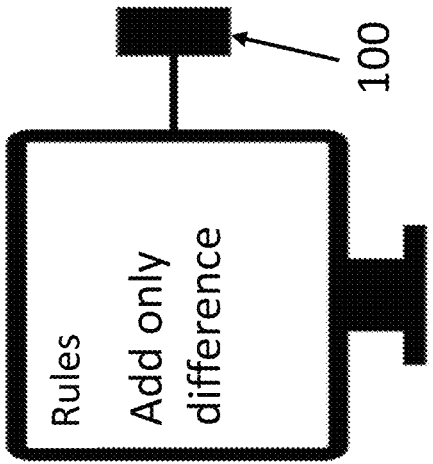
FIG. 4 is a highly schematic illustration of the alteration options for updating data traffic rules.
Figure 4:
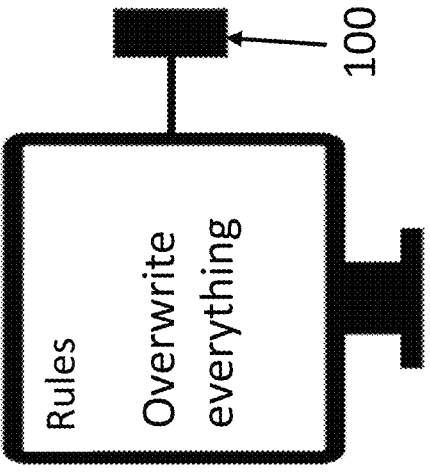
Figure 4:
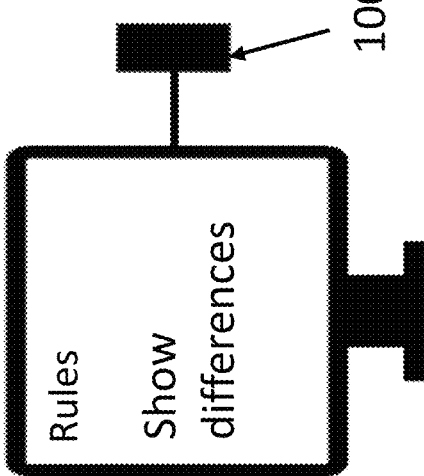

Different possibilities specific to the application and/or network components can also be used when loading an updated data set into the network component. For example, as shown in a highly schematic manner in FIG. 4, a difference in the data traffic rules can be displayed, which completely overwrite the adapted data traffic rules for updating, in order to completely replace the previous data traffic rules, or overwrite only the difference between the data traffic rules for updating, in order to supplement the previous data traffic rules accordingly.

Since the data traffic rules or in general the rule sets are therefore not changed or updated automatically on the basis of the recorded communication relationships, this additionally increases security. In addition, for example a 4-eyes principle can be applied when updating the data traffic rules, in order to train users for example. It is thus possible for example for a user A to configure the data set externally, and user B to configure a corresponding data set on the device. Subsequently, the external file set is installed in addition. If the data sets are different, an indication will be given. The cause can then be clarified, in particular whether user A or B has not taken something into consideration.

If the recording functionality is activated, a directional firewall function of the network component will expediently also be deactivated, in principle, for this period, in particular if the entire incoming and outgoing data traffic is to be transmitted for recording, in order to acquire the communication relationships and adapt corresponding "allow rules". In this case, there are also applications in which the recording may take several hours or possibly even days in order to capture all communication relationships. If, for example, a user has forgotten to deactivate the recording functionality after an intended "recording time window", the network component would thus remain permanently in the "recording mode" and without a firewall function all data packets would be able to pass, which represents a security risk. In this case, a timer function as described above can, for example, reduce such a security risk. If the timer runs out after a preset time period, for example, the recording functionality will be automatically deactivated and the data traffic restricted again. Advantageously, such a preset time period, for example 2 hours, can, however, also be adjusted accordingly by the user.

If, for example, a user, in particular an employee, activates the recording functionality of the network component remotely, in particular with corresponding IT access rights, and at the same time deactivates the established firewall function, for example for 12 hours (night run), but is then suddenly unwell, the activated timer function will nevertheless be switched off automatically after the 12 hours have elapsed, and the network component can additionally also be set back into the initial state before activation of the recording functionality. The security gap has been automatically closed.

Furthermore, it is within the scope of the invention that such a timer function can be set immediately to zero via a signal connected to a predetermined digital signal input connection of the network component. An activated recording functionality can thus be deactivated abruptly.

If, for example, a user, in particular employee, has remotely activated the recording functionality for 5 hours, in order to record the data traffic, and another user, in particular employee, sees on site that the apparatus or a component communicating via the network component, in particular a machine, is behaving atypically, the user on site can press an "emergency stop button" for example, and the network component switches immediately back into the safe original state, i.e. the recording functionality is deactivated and a firewall function is reactivated. This is also expedient if the set time period (e.g. 5 hours) has not yet elapsed. In the "emergency", the user on site can thus immediately set the timer function to zero and put the network component back into the initial state before activation of the recording functionality.

If, as described above, a firewall function configured with the network component is deactivated as long as the recording functionality is active, the activation/deactivation of the recording functionality can also frequently take place via the web-based management. The access to the web-based management device can also take place, as described, remotely, for example from another building. The remote activation of the recording functionality thus represents a security risk. In order that a user on site can recognize that the firewall function has been temporarily deactivated, a switching output can expediently be set accordingly at the network component. Via this switching output, for example, a display, e.g. signal lamp, on a machine can then be switched, in order to inform personnel on site of the deactivation of the firewall, e.g. by lights or by flashing of a lamp.

Accordingly, if, for example, a user, in particular employee, in particular with corresponding IT rights, remotely accesses the firewall function, by activating the recording functionality, and as a result the firewall function deactivates the firewall, they may, however, mistype when specifying the time period for an integrated timer function, and for example specify 55 hours instead of 5 hours. A user, in particular employee, on site, even without access rights to the firewall function, is now able to inform an IT technician, with the aid of the display, after 6 or 7 hours, that the recording functionality is still activated and the firewall function is deactivated. Monitoring according to the 4-eyes principle between the IT technician and the user on site can thus be implemented.

As described above, the recording functionality can for example be activated or deactivated remotely, in particular via a web-based management. If this is not coordinated with a user on site, this can represent a security risk. Changing a firewall function in general, and activating the recording functionality in particular, can thus represent a security risk.

The network component according to the invention, in particular an industrial firewall in the example described here, therefore expediently has at least one predetermined digital signal input connection for connecting a signal, for example by setting a wire bridge, in order to block access to the activated data traffic rules currently activated in each case, and preferably in principle prevents any change in the setting of the firewall function. In a simple form, the network component has only one voltage input for this purpose. In an expansion stage, the network component has a voltage output and a voltage input. This has the advantage that the customer only needs to set a short wire bridge or a connection plug between 24V and the voltage input, and the firewall blocking can be released quickly, by pulling the wire bridge or the plug.

For example, a user, in particular employee, has corresponding access rights in order to be able to access the web-based management remotely. Said user wants to quickly change the firewall function, in particular the data traffic rules of the network component according to the invention, remotely via the web-based management, in order, for example, to try something out. Any change in the setting of the firewall function, however, is in principle prevented by setting a wire bridge as described above. The remote user can view and change other areas in the WBM (Web-Based Management), but not the firewall function or data traffic rules. In order to be able to change these, a user must first remove the electrical connection between 24V and the voltage input, for example the set wire bridge, on site. Only now can the remote user, who normally also has the rights and holds the corresponding role to carry out such changes, change the firewall function, in particular also the data traffic rules, of the network component according to the invention, in the web-based management. A "hard" locking according to the 4-eyes principle between the IT technician with corresponding access rights and a user has thus been implemented on site.

As described above with reference to FIG. 3, it can also be provided that a configuration can be carried out remotely by means of a correspondingly configured system without a user, for example fully automatically configuring an established firewall function of the network component via a machine-to-machine interface (RESTful API interface). It can thus also be important here that, at the end, a user on site also has the opportunity to intervene quickly.

It can thus be concluded in summary, taking into account the above description, that, according to the invention, a recording of the communication relationships does not occur during a learning phase.

It is rather the case, in contrast to this, that the data traffic is only recorded by activating the recording functionality, and the recording is ended by deactivating the recording functionality. Only subsequently is a summary of the communication relationships created from the recording data. In this case, only double entries are not recorded, but no special learning algorithm is used. Via a web-based interface, the communication relationships can be displayed, for example, in order to plan and process them. The determined communication relationships can expediently be stored in a protected memory area and/or the application of the communication rules is preferably carried out in a control unit, such as a CPU or a switch module, and is expediently independent of the web-based interface. The current data traffic rules are therefore not automatically replaced in a learning phase. This increases security.

The rules are transmitted to the network component only when the recording has ended and the user checks the communication relationships and considers them to be correct. This also increases security. No optimization algorithm that checks the rules for plausibility is thus used in a learning phase.

When the communication relations are captured, double entries, e.g. in an internal table created here, are, however, expediently prevented. However, no optimization takes place, such as an umbrella rule or the like being formed from three individual rules.

The invention claimed is:

1. An apparatus comprising:

a router or a firewall device connected between at least two networks, the at least two networks comprising communication networks, system networks or computer networks, the router or the firewall device designed for allowing data traffic to pass between the at least two networks or to block a passage of data traffic through the router or the firewall device, depending on adaptable and correspondingly activated data traffic rules, wherein the router or the firewall device has an integrated component that provides a recording functionality for recording communication relationships present during the passage of the data traffic, and at least one of: a START/STOP button is arranged in a web-based management of the router or firewall device; a predetermined digital signal input connection of the router or firewall device; and an external central management tool is/are provided for injecting a signal interacting with the recording functionality for temporarily activating and deactivating the recording functionality, and wherein the router or the firewall device is constructed to release the recorded communication relationships to a processing program for adapting and subsequently activating the data traffic rules after conclusion of the recording of the communication relationships and only after the recording functionality has been deactivated by the at least one of: the START/STOP button; the predetermined digital signal input connection; and the external central management tool.

2. The apparatus according to claim 1, wherein the router or firewall device is designed and configured not to re-record already recorded communication relationships in the event of repeated occurrence, when the recording functionality for recording communication relationships is activated.

3. The apparatus according to claim 1, further comprising at least one of:

the recording functionality coupled to a timer function, visual and acoustic display coupled to the recording functionality for displaying a respective state of an activated recording functionality, and a wire bridge for temporarily blocking access to currently activated data traffic rules in each case.

4. A method for operating a router or a firewall device connected between at least two networks, the at least two networks comprising communication networks, system networks or computer networks and designed for allowing data traffic to pass between the at least two networks or to block a passage of data traffic through the router or firewall device, depending on adaptable and correspondingly activated data traffic rules, wherein the router or the firewall device has an integrated component that provides a communication relationship recording functionality for recording communication relationships present during the passage of the data traffic, the method comprising:

temporarily activating and deactivating the recording functionality for recording communication relationships with at least one of:

a START/STOP button in a web-based management of the router or the firewall device, injecting a signal into a predetermined digital signal input connection of the router or the firewall device, and an external central management tool, and after conclusion of the recording of the communication relationships and only after having deactivated the communication relationship recording functionality, processing recorded communication relationships for adaption and subsequent activation of the data traffic rules.

5. The method according to claim 4, wherein the communication relationships during a temporary activation are only recorded once, and the already recorded communication relationships are not recorded again upon repeated occurrence.

6. The method according to claim 4, further comprising at least one of:

activating a timer function together with the activating of the recording functionality, displaying a state of the activating of the recording functionality with at least one of a visual and acoustic display, and temporarily enabling or blocking an access to the data traffic rules, currently activated in each case.

* * * * *